United States Patent [19]

Scheuter et al.

[11] Patent Number: 4,673,049
[45] Date of Patent: Jun. 16, 1987

[54] WEIGHING DEVICE FOR WEIGHING WHEEL LOADS

[75] Inventors: Felix Scheuter, Bolligen; Ernst Schindler, Mittelhaeusern, both of Switzerland

[73] Assignee: Haenni & Cie. AG., Jegenstorf, Switzerland

[21] Appl. No.: 871,762

[22] Filed: Apr. 2, 1986

[30] Foreign Application Priority Data

Apr. 25, 1985 [CH] Switzerland .................. 1765/85

[51] Int. Cl.$^4$ ............................................ G01G 5/04
[52] U.S. Cl. ..................................... 177/209; 177/254
[58] Field of Search .................... 177/208, 209, 254

[56] References Cited

U.S. PATENT DOCUMENTS

| 3,378,090 | 4/1968 | Christie | 177/208 X |
| 4,007,800 | 2/1977 | Janach et al. | 177/209 |
| 4,489,798 | 12/1984 | Menon | 177/254 X |
| 4,498,550 | 2/1985 | Menon | 177/209 |

Primary Examiner—George H. Miller, Jr.

Attorney, Agent, or Firm—Brady, O'Boyle & Gates

[57] ABSTRACT

The weighing device for wheel loads has a platform (3) which distributes the load over a plurality of elongated hollow elements (2) disposed parallel with and at equal distances apart from and alongside one another on a baseplate (1). The hollow elements (2) consists of springing material and their cavities (12) are filled with fluid. A connecting line links the cavities (12) to a measuring device which is calibrated in units of weight and measures the volume of fluid displaced from the cavities (12) under load. The cavities (12) in the hollow elements (2) have a split or gap-shaped cross-section, and are substantially parallel with the platform (3). The gap width in the hollow elements (2) is so dimensioned that the inside faces of the hollow elements (2) which define the gap (12) at least partially abut each other when the weighing device is overloaded, prior to the elasticity limit of the hollow elements (2) being reached. By virtue of the cross-sectionally split or gap-shaped construction of the cavities (12), a plastic deformation of the hollow elements (2) is easily avoided without the disposition of rod elements in the cavities.

10 Claims, 5 Drawing Figures

WEIGHING DEVICE FOR WEIGHING WHEEL LOADS

The invention relates to a weighing device, in particular a device for weighing wheel loads, according to the preamble to patent claim 1.

A weighing device of this type is known from Swiss Patent Specification No. 597 595. The portable device for weighing wheel loads comprises a platform which distributes the wheel load over a row of cross-sectionally substantially elliptical tubes of springing material disposed parallel alongside one another on a baseplate. The tubes are filled with fluid and are connected to a measuring device calibrated in units of weight, which measures the fluid displaced from the tubes when the load is applied. In order to avoid an irreversible plastic deformation of the tubes when the weighing device is overloaded, it is necessary to dispose in each tube a rod element which limits the amount of compression. The cross-sectional form of the rod elements must thereby be computed accurately according to the admissible deformation of the tubes and the desired volume of intermediate space to accommodate the fluid. This is structurally complicated and expensive. Furthermore, temperature compensation is difficult because in addition to the expansion of the tubes and of the fluid it is also necessary to take into account that of the rod elements.

The invention is based on the problem of so further developing the weighing device of the type in question that it can be produced more easily and inexpensively and permit of more accurate measurement.

The invention resolves this problem by the features indicated in the characterizing part of claim 1.

In the case of the solution according to the invention, the hitherto necessary rod elements are dispensed with so that the weighing device can be produced more easily and inexpensively. The cross-sectionally split-shaped construction of the cavities guarantees an exactly linear spring characteristic of the hollow elements, i.e. an exactly load-proportional increase in the liquid displaced from the hollow elements and thus an exact measurement even if the loading on the individual hollow elements is uneven. Furthermore, the following advantages are achieved: the cross-sectionally split-shaped, in other words very narrow construction of the cavity in the hollow elements results in a corresponding reduction of the height of the weighing device which is essential particularly in the case of devices used for weighing wheel loads. Because no rod elements are used, the weight of the expediently portable weighing device is also reduced. The solution according to the invention furthermore permits of accurate compensation for heat expansion of fluid and hollow elements. To this end, the weighing device is preferably, according to claims 4 and 5, equipped with second hollow elements and a compensating device.

Further preferred forms of embodiment of the invention are embraced by claims 2, 3 and 6 to 10.

One example of embodiment of the invention is explained in greater detail hereinafter with reference to the accompanying drawings, in which.

Figure 1:
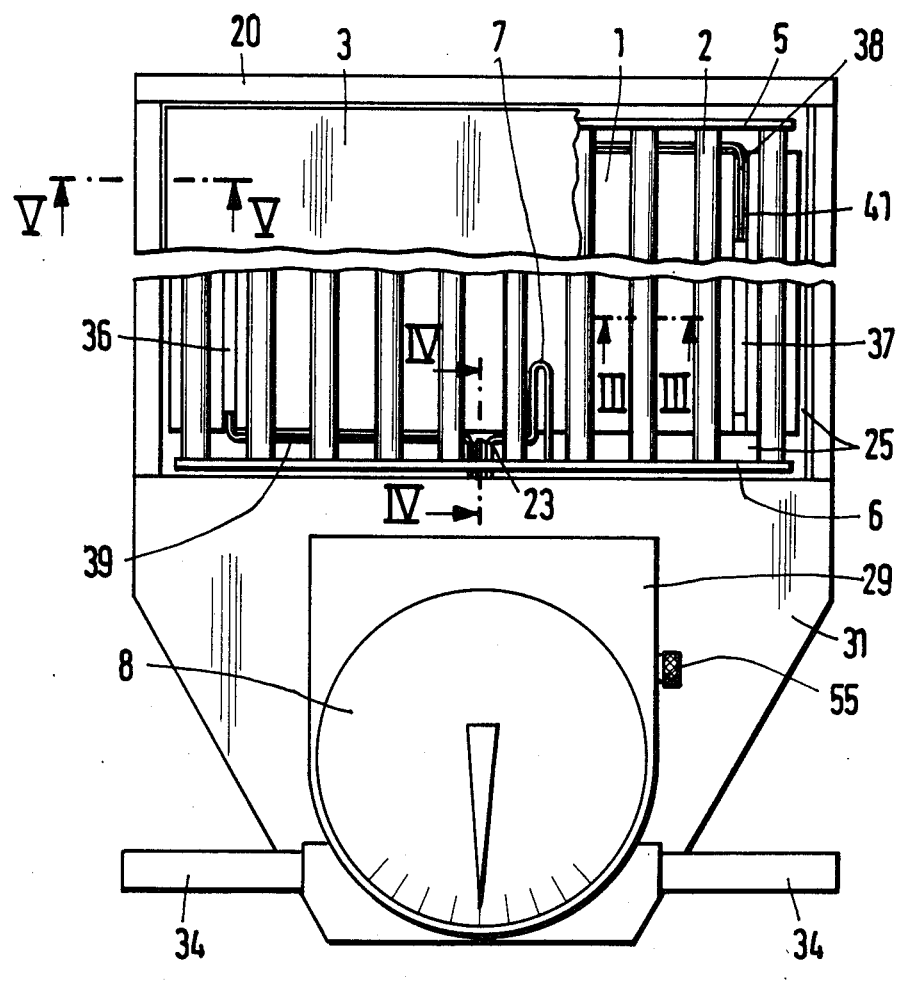
FIG. 1 is a plan view of a wheel load balance.

The wheel load weighing device has a baseplate 1 on which there are, disposed at equal distances from and alongside one another, parallel elongate hollow elements 2 of springing material. Lying on the hollow elements 2 is a platform 3 which distributes the wheel load over the hollow elements 2. The cavities 12 in the hollow elements 2 are interconnecting at their ends at one end by a tube 5 and at their other end by a tube 6. The platform 3 and the baseplate 1 have in the region of the tubes 5, 6 channel-shaped depressions which ensure that even under overload the platform 3 will not strike the tubes 5, 6 but will remain supported by the hollow elements 2. Thus, the risk of bending of the tubes 5, 6 and of the platform 3 will be avoided. From the tube 6, a connecting line 7 leads to a measuring device 8. The hollow elements 2, the tubes 5, 6, the connecting line 7 and a corrugated tube (bellows) 10 of the measuring device 8 which is connected thereto are completely filled with fluid. The measuring device 8 described in greater detail hereinafter measures the volume of liquid displaced from the cavities 12 of the hollow elements 2 under loading and is calibrated in units of weight.

Figure 3:
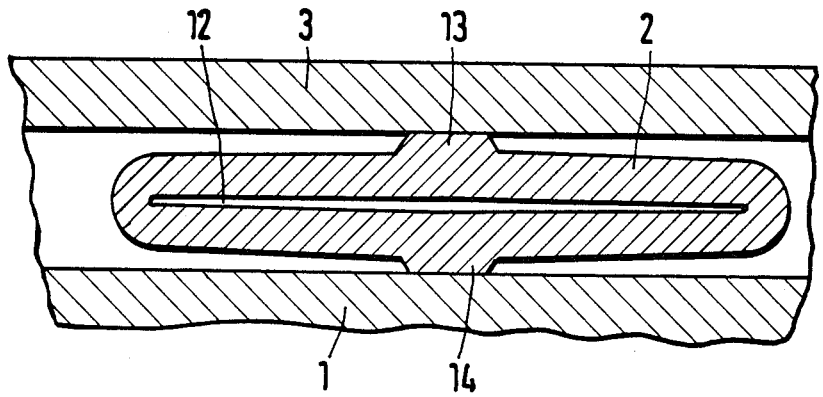
FIG. 3 shows a cross-section through one of the hollow elements carrying the platform, according to the line III—III in FIG. 1.

As FIG. 3 shows, the cavities 12 of the hollow elements 2 have a split-shaped cross-section. The splits extend parallel with the platform 3 and the width of the split (the inside measurement of the split taken at a right-angle to the platform 3) is so dimensioned that the inner faces of the hollow elements 2 which define the gap or split 12, when the weighing device is overloaded, abut each other before the elasticity limit of the hollow elements 2 is reached. In the region of the centre of their cross-section, the hollow elements 2 have on the outside at top and bottom and extending over their entire length strip-like projections 13, 14. The lower projection 14 lies on the baseplate 1 while the upper projection 13 which is situated exactly vertically above it lies on the platform 3 so that when the platform is under load, the hollow elements 2 are compressed along their cross-sectional centre.

The width of the split, when the element is not under load, is at the ends of the cross-section of the split substantially half as great as it is in the centre of the cross-section. Under an average loading, the width of the split is substantially constant over the entire cross-section. At the maximum admissible loading, the gap width diminishes towards the centre of the cross-section where it then amounts to only about one-third of the gap width when the element is not under load. If the loading amounts to one-and-a-half times the maximum admissible loading, the middle portions of the inside faces of the hollow elements will abut each other. The tension in the cavity walls will then be less than the elasticity limit by a tolerance of at least 10%.

Measured in this way, the gap width amounts to only a fraction of the wall thickness of the hollow elements 2. In the example of embodiment, the gap width in the centre of its cross-section and when the hollow element is not under load, amounts to less than one-quarter of the wall thickness of the hollow element. Tests have shown that with the described form of hollow elements and the indicated dimensioning of the gap width, a plastic deformation of the hollow elements is reliably avoided even if the weighing device is heavily overloaded.

It has furthermore been demonstrated that the described form of the hollow element 2 guarantees a linear spring characteristic. This means that the quantity of liquid displaced by reason of a diminution of the gap width when the hollow element 2 is under load increases exactly in proportion to the loading. Because all hollow elements function on an exactly linear basis, an exact measurement is guaranteed even if the wheel load is not evenly distributed over the individual elements. Furthermore, the platform 3 ensures that the wheel load cannot be applied so unevenly that one single hollow element 2 becomes completely depressed under the maximum admissible loading.

Vulcanized onto the underside of the peripheral edge 17 of the platform 3 is a rubber sealing strip 18. The free edge of the sealing strip 18 is clamped securely between the baseplate 1 and a frame 20 encircling the platform 3 with a gap in relation thereto. The height of the frame 20 is virtually the same as that of the unladen platform 3. This latter is held on the baseplate 1 solely by the rubber-elastic sealing strip 18 so that the supporting arrangement does not have to accommodate any forces, the entire load being transmitted by the platform 3 to the hollow elements 2. In other words, the platform 3 "floats" so to speak on the hollow elements.

The sealing strip 18 tightly seals the space 21 between the platform 3 and the baseplate 1, in which the hollow elements 2 are located. To equlize the pressures between the space 21 and the atmosphere, a vent tube 23 emerges from the space 21. One end portion 24 of the vent tube 23 is located in a channel 25 in the baseplate 1 and extending under the peripheral edge 17 of the platform 3 and into which projects the bottom part of the tubes 5, 6 and of the U-shaped downwardly bent middle portion of the sealing strip 18. The other end portion 26 of the vent tube 23 is, after the fashion of a riser pipe, located in a vertical bore 27 in one side wall 28 of the housing 29 of the measuring device 8. The housing 29 is mounted on a supporting plate 31, spacers (feet) 30 being located between the housing 29 and the supporting plate 31 to maintain the housing 29 at a distance from the supporting plate 31. The intermediate space between the housing 29 and the supporting plate 31 is designated 33.

The vent tube 23 not only serves to equalize pressures between the space 21 and the atmosphere but also to carry away any condensate which may collect in the space 21. If condensate forms, it passes into the channel 25 and thus to the inlet 24 of the vent tube 23. As the temperature rises or when there is a loading on the weighing device or when there is a fall in ambient pressure, there is created in the space 20 an overpressure which is immediately compensated by the vent tube 23, the condensate being forced through the vent tube into the bore 27 from which it flows downwards into the open intermediate space 33 between the housing 29 and the supporting plate 31. Locating the riser pipe 27 in the bore which is only open at the bottom guarantees that no water can penetrate the space 20 from outside through the vent tube.

The (in FIG. 1) upper edge of the support plate 31 forms a part of the frame 20, i.e. it is screwed onto the edge of the baseplate 1 and clamps the sealing strip 18 firmly on the edge of the baseplate 1 (the support plate 31 could naturally also be screwed onto a corresponding frame strip).

Figure 4:
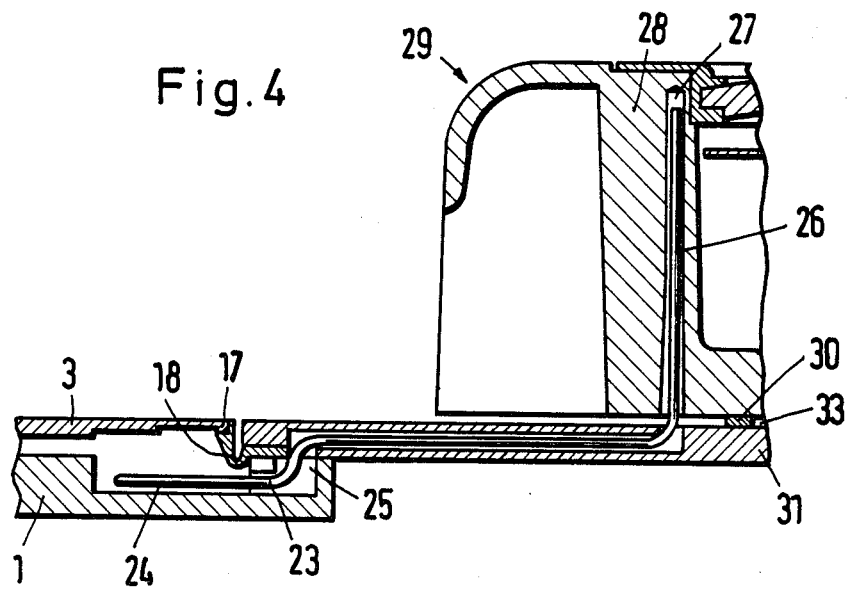
FIG. 4 shows a vertical section through a part of the weighing device through which a vent tube is passed, according to the line IV—IV in FIG. 1, on an enlarged scale.
Figure 5:
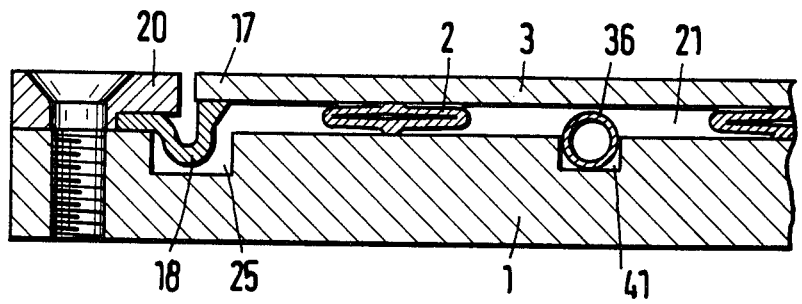
FIG. 5 shows a vertical section through a marginal zone of the weighing device taken on the line V—V in FIG. 1.

The vent tube 23, the connecting line 7 and a connecting line 39 still to be described hereinafter are passed out of the space 21 at the same point and onto the support plate 31. The lead-through is sealed by sealing material. For reasons of clarity of representation, FIG. 1 shows the three tubes 7, 23 and 39 at the lead-through point as being spaced apart from one another. In FIG. 4, for the same reasons, only the tube 23 is shown; the lines 7, 39 and the tube 6 extending transversely to these and extending into the channel 25 are omitted.

Furthermore, two handles 34 for carrying the weighing device are provided on the support plate 31.

To compensate for heat expansion of the fluid in the hollow elements 2, the following provisions obtain:

Disposed in the space 21 between the hollow elements 2 there are two compensating tubes 36, 37, of which the entire cavity volume corresponds to the sum of the cavity volumes of the hollow elements 2, and which are filled with the same fluid as are the hollow elements 2. The two compensating tubes 36, 37 are connected to each other by a connecting line 38 and to a second bellow 40 of the measuring device 8 by a connecting line 39. So that the compensating tubes 36, 37 lie outside of the displacement path of the platform 3 which is bounded by the gap width of the hollow elements 2, there are milled into the baseplate 1 channels 41 which communicate with the peripheral channel 25 and which accommodate the bottom part of the compensating tubes. The measuring device 8 is equipped with a compensating device 42 which compensates for the effect on the measuring device 8 of the quantity of fluid displaced from the hollow elements 2 due to heat expansion by means of the quantity of fluid displaced correspondingly from the compensating tubes 36, 37, so that the measurement is independent of temperature. (It goes without saying that the connecting lines of the hollow elements 2 and compensating tubes 36, 37 and also the capsules 10, 40 are also so dimensioned that all in all the same volumes of fluid are contained therein.)

Figure 2:
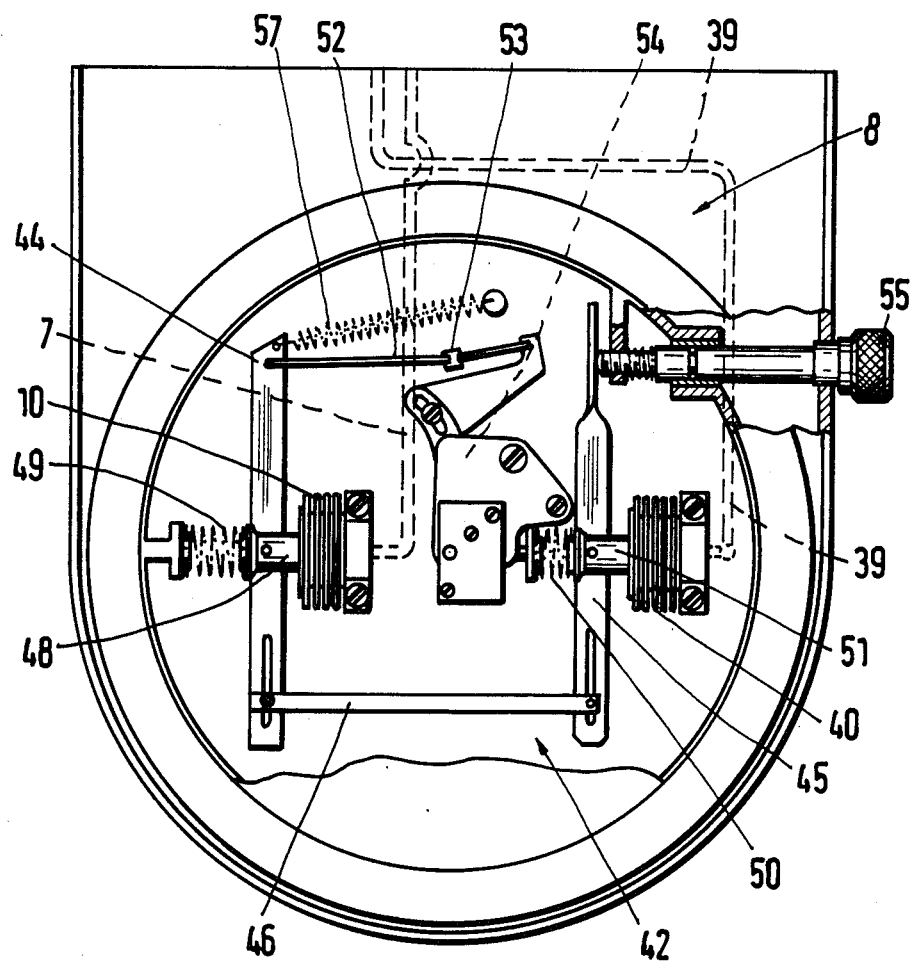
FIG. 2 is a plan view of the measuring device of the weighing device, without the dial and the pointer, on an enlarged scale.

The compensating device 41 shown in FIG. 2 has two equally long levers 44, 45 which are approximately parallel at half the maximum loading of the weighing device. The (in FIG. 2) lower ends of the levers 44, 45 are connected to each other in articulating fashion via a tie-rod 46, the swivel joints for adjustment purposes being displaceable in elongated holes in the levers. The bellows unit 10 carries a thrust bolt 48 articulated substantially in the middle of the lever 44 and loaded by a thrust spring 49 which seeks to compress the bellows 10. Correspondingly a thrust bolt 51 of the bellows unit 40 and loaded by a thrust spring 50 is articulated on the lever 45. The (in FIG. 2) upper end of the lever 44 is articulatingly connected to the pointer mechanism 54 of the measuring device 8 by a tie-rod 52, the length of which is variable by a bimetal element 53. The purpose of the bimetal element 53 is to compensate for temperature-related variations in the elasticity modulus of the hollow elements 2. The (in FIG. 2) upper end of the lever 45 is supported on a zero setscrew 55. So that the end of the lever 45 always bears reliably on the zero setscrew 55, a draw spring 57 is attached to the (in FIG. 2) upper end of the lever 44. (The coil spring of the pointer mechanism 54 acts on the lever system in the same way as the draw spring 57 but its spring force is too weak to guarantee that the lever 45 will be constantly applied against the zero setscrew 55.)

When the weighing device is under load, the fluid displaced from the hollow elements 2 produces a displacement of the thrust bolt 48 of the bellows 10 in proportion to the volume of the displaced fluid and thus in proportion to the load, so that the lever 44 is pivoted about its articulation point on the tie-rod 46 and the pointer mechanism 54 is displaced accordingly. A variation in temperature produces an equal variation in volume of fluid in the hollow elements 2 and the compensating tubes 36, 37 (and also the connecting lines and the bellows or capsules 10, 40), so that the thrust bolts 48, 51 of the two bellows 10, 40 pivot in the same angular direction and by the same angular amount, the lever 45 about the bearing point on the setscrew 55, the lever 44 about its articulation point on the tie-rod 52, and the pointer mechanism 54 is not adjusted.

Since the same fluid is present in the hollow elements 2 and in the compensating tubes 36 and 37, compensation is reliable even if the heat expansion coefficient (temperature coefficient) of the fluid is not constant but is a function of the temperature.

In the case of an embodiment which is not shown, the weighing device is provided with an electronic display in which case, instead of the pointer mechanism, a mechanical-electrical converter (a travel recorder, e.g. a potentiometer) is provided which registers the movement of the tie-rod 52. Instead of the lever system 44 to 46, it would be possible in this case to locate such a converter or travel recorder on each of the two bellows units 10, 40 and to provide a subtraction member to subtract the deflection of the bellows 40 from that of the bellows 10. Furthermore, the weighing device could have a connection for a display common to a plurality of weighing devices, to indicate the measured results of weighing devices loaded by the individual wheels of a vehicle and ideally comprises a calculating mechanism to calculate the total weight of the vehicle.

We claim:

1. Weighing device, in particular a device for weighing wheel loads, comprising a platform (3) which distributes the load over a plurality of elongated hollow elements (2) consisting of springing material and in which the cavities (12) are filled with fluid and which communicate (7) with a measuring device (8) calibrated in units of weight, which measures the volume of fluid displaced from the cavities (12) in the hollow elements (2) under loading, characterized in that the cavities (12) of the hollow elements (2) are of split-shaped cross-section, are substantially parallel with the platform (3), the width of the split being so dimensioned that the inside faces of the hollow elements (2) which define the split or gap (12) will at least partially abut each other when the weighing device is overloaded, before the elasticity limit of the hollow elements (2) is reached.

2. Weighing device according to claim 1, characterized in that in the region of the centre of their cross-section, on their upper and/or lower outside faces, the hollow elements (2) have projections (13, 14) respectively bearing on the platform (3) and on a baseplate (1).

3. Weighing device according to claim 1 or 2, characterized in that the gap width (12) amounts to only a fraction of the wall thickness of the hollow elements (2).

4. Weighing device according to claim 1, characterized in that in the space (21) in which the hollow elements (2) are located, there are outside the path of displacement of the platform (3) one or a plurality of second, e.g. tubular, hollow elements (36, 37), of which the total cavity volume corresponds to the total cavity volume of the first hollow elements (2), and which are filled with the same fluid as the latter and which are connected (39) to a compensating device (42) of the measuring device (8), which compensates for the effect on the measuring device (8) of the quantity of fluid displaced from the first hollow elements (2) due to heat expansion, by means of the quantity of fluid correspondingly displaced from the second hollow elements (36, 37), so that the measurement is independent of temperature.

5. Weighing device according to claim 4, characterized in that the compensating device (42) has two equally long levers (44, 45) connected at one end by a tie-rod (46), and in that the other end of the first lever (44) is articulatingly connected to a pointer mechanism (54) or a mechanical-electrical converter of the measuring device (8) while that of the second lever (45) is mounted on a zeroing device (55) and in that on the first lever (44), connected to the first hollow elements (2) and on the second lever (45) connected to the second hollow elements (36, 37) and adapted to convert into a thrust movement the increase and decrease in the quantity of fluid displaced from the hollow elements (2, 36, 37), a device (10, 40) is so articulated that for equal supply of fluid from the first and second hollow elements (2, 36, 37), the two levers (44, 45) are pivoted about their other ends in the same direction and by the same amount.

6. Weighing device according to claim 1, in which the platform (3) is supported on the edge of a baseplate (1) on which the hollow elements (2) are located, characterized in that the platform (3) is supported on the baseplate (1) only by flexible, preferably rubber-elastic connecting means (18) attached to the peripheral edge (17).

7. Weighing device according to claim 1, in which the hollow elements (2) are located on a baseplate (1), characterized in that the space (21) between the platform (3) and the baseplate (1) is tightly sealed by flexible connecting means (18) connecting the peripheral edge (17) of the platform (3) to the baseplate (1), the cavities (12) in the hollow elements (2) being connected (5, 6) to one another in the said space (21) and being connected by a tube (7) extending out of the space (21) to the measuring device (8) located outside of the space (21) and in that for purposes of equalizing pressures between the space (21) and the atmosphere a vent tube (23) extends out of the space (21).

8. Weighing device according to claim 7, characterized in that one end portion (24) of the vent tube (23) discharges into a channel (25) in the baseplate (1) while the other end portion (26) is formed by a riser pipe located in a cavity (27) closed at the top and opened at the bottom and disposed outside of the said space (21).

9. Weighing device according to claim 8, characterized in that there is on one side of the baseplate (1) a support plate (31) for the housing (29) of the measuring device (8) on which this latter is supported at a distance by spacers (30) and in that the cavity (27) into which extends the end portion (26) of the vent tube (23) which is constructed as a riser pipe, is constitued by a bore (27) in a side wall (28) of the housing (29) of the measuring device (8) which at the bottom empties into the open intermediate space (33) between the housing (29) and the support plate (31).

10. Weighing device according to claim 6 or 7, characterized in that fixed on the baseplate (1) and encircling the platform (3) at a distance therefrom there is a frame (20) which has the same or virtually the same height as the unladen platform (3) and in that the flexible connecting means are constituted by, fixed on the peripheral edge (17) of the platform (3), a rubber-elastic strip (18) which is clamped securely between the frame (20) and the baseplate (1).

* * * * *